(12) United States Patent
Hsin et al.

(10) Patent No.: US 8,609,188 B2
(45) Date of Patent: Dec. 17, 2013

(54) SURFACE MODIFICATION OF NANO-DIAMONDS AND MANUFACTURING METHOD THEREOF

(75) Inventors: Yu-Lin Hsin, Tainan County (TW); Woan-Shiow Tserng, Hsinchu (TW); Ting-Yao Su, Pingtung (TW)

(73) Assignee: Industrial Technology Research Institute, Hsinchu County (TW)

( * ) Notice: Subject to any disclaimer, the term of this patent is extended or adjusted under 35 U.S.C. 154(b) by 403 days.

(21) Appl. No.: 12/946,871

(22) Filed: Nov. 16, 2010

(65) Prior Publication Data

US 2012/0003479 A1 Jan. 5, 2012

(30) Foreign Application Priority Data

Jul. 1, 2010 (TW) ................................ 99121637 A

(51) Int. Cl.
  *C23C 24/04* (2006.01)
  *B82Y 30/00* (2011.01)
  *C08F 8/00* (2006.01)

(52) U.S. Cl.
  USPC ............. 427/212; 428/407; 423/446; 525/55; 427/290

(58) Field of Classification Search
  USPC ................... 427/290, 212; 428/407; 423/446; 525/55
  See application file for complete search history.

(56) References Cited

U.S. PATENT DOCUMENTS

| 2008/0249229 A1 | 10/2008 | Lukehart et al. | |
| 2012/0034464 A1* | 2/2012 | Chakraborty et al. | ......... 428/402 |

FOREIGN PATENT DOCUMENTS

| CN | 1380363 A | 11/2002 |
| CN | 1439451 A | 9/2003 |
| CN | 101205422 A | 6/2008 |
| WO | 2008096314 A2 | 8/2008 |

OTHER PUBLICATIONS

Aleksensky et al., "Nanodiamonds Intercalated with Metals: Structure and Diamond-Graphite Phase Transitions", Diamond & Related Materials, Elsevier, 2004, p. 2076-2080.*
Chang et al., "Facile Surface Functionalization of Nanodiamonds", Department of Chemistry, National Tsing Hua University, Hsinchu, Taiwan, American Chemical Society, 2009, p. 3685-3689.*
Office Action (Notice of First examination opinion) issued by the China Intellectual Property Office on Sep. 24, 2012, for the above-referenced application's counterpart application in China (Application No. 201010246164.4).
Office Action (Notice of Examination Opinion) issued by the Taiwan Intellectual Property Office on Jan. 23, 2013, for the above-referenced application's counterpart application in Taiwan (Application No. 99121637).
Office Action (Notice of Second examination opinion) issued by the China Intellectual Property Office on May 2, 2013, for the above-referenced application's counterpart application in China (Application No. 201010246164.4).
Qiao, "Fabrication and Experimental Method for Composite Material", Chinese Doctoral Dissertations Full-Text Database, Engineering Science & Technology I, 2009, No. 4 (Publication Date: Apr. 15, 2009).
Zang et al, "Superhard Abrasives Cladding Technology and Its Application", Diamond & Abrasives Engineering Bimonthly, No. 3, 2000 (Publication Date: Dec. 31, 2000).

* cited by examiner

*Primary Examiner* — Frederick Parker
*Assistant Examiner* — Ann Disarro
(74) *Attorney, Agent, or Firm* — Pai Patent & Trademark Law Firm; Chao-Chang David Pai

(57) ABSTRACT

The invention is related to a technique that grafts polymer onto a surface of nano-diamonds, and the invention further provides applications relating to modification and dispersion of the nano-diamonds. The features of the technique are single step, one pot, low cost, and high yield, and therefore the technique has high potential for commercialization. The invention also provides a method for graphitizing monocrystalline nano-diamonds and polycrystalline nano-diamonds. Accordingly, the technique of modifying and polymer grafting can be used not only on ultra disperse diamonds but also on monocrystalline nano-diamonds with graphitized surfaces and polycrystalline nano-diamonds with graphitized surfaces.

10 Claims, 6 Drawing Sheets

SURFACE MODIFICATION OF NANO-DIAMONDS AND MANUFACTURING METHOD THEREOF

CROSS REFERENCE TO RELATED APPLICATIONS

This Application claims priority of Taiwan Patent Application No. 099121637, filed on Jul. 1, 2010, the entirety of which is incorporated by reference herein.

BACKGROUND OF THE INVENTION

1. Field of the Invention

The present invention relates to nano-diamonds, and in particular relates to surface modification of the nano-diamonds.

2. Description of the Related Art

There are three commercial methods to produce nano-diamonds: Chemical vapor deposition, high pressure catalysis, and detonation. Different manufacturing methods result in different forms of the nano-diamonds, wherein the forms of the nano-diamonds can be commonly divided into ultradisperse nano-diamonds (UDD), monocrystalline nano-diamonds, and polycrystalline nano-diamonds. The ultradisperse nano-diamonds have particle sizes between 4 to 6 nm, and surfaces of the ultra disperse nano-diamonds are covered by a fullerene-like carbon, which aggregates into particles of hundreds of nanometers in diameter. Both the monocrystalline nano-diamonds and the polycrystalline nano-diamonds are single particle nano-diamonds with no graphite structures on surfaces thereof. The nano-diamonds are not only hard, they also have extremely high thermal conductivity, high wear-resistance, and good chemical stability, but they also have large surface areas and high surface activities. Nano-diamonds have been proposed to be used as a lubricating material (Chepovetskii, I. Kh.; et al. Mater. 1993, 3, 48-50), as reinforce additive of high strength resins or rubbers (Chkhalo, N. I.; et al. NIST Spec. Publ., 1995, 88, 27-30), for high precision polishing (Dolmatov, V. Y. Russ. Chem. Rev., 2001, 70, 607.), as a wear resistant composite film (Chang, et. al., China Patent Application No 200710074533.4), and so forth. It is often desirable to improve the dispersion of the nano-diamonds in solvents in order to increase their applicability. However, nano-diamonds easily aggregate to micro size, and lose their unique features as nano-particles due to the high specific surface energy. Therefore, nano-diamonds have not been widely used in these fields. Currently, another reason why nano-diamonds have not been widely used is that it is difficult to improve the dispersion of the nano-diamonds in media, while at the same time increase the stability of the dispersion; especially for the monocrystalline nano-diamonds and the polycrystalline nano-diamonds, wherein surface modifications of the trace graphite structure on the surfaces thereof are not easy. Note that surface modification or dispersion techniques related to nano-diamonds have been disclosed, such as US 2008/0249229A1, which utilizes atom-transfer-radical polymerization (ATRP) to graft polymers onto the surface of nano-diamonds. The technique requires using nitric acid to oxidize the graphite structure on the surface of the nano-diamonds into carbonate. Then, a series of reactions proceed to graft polymers onto the nano-diamonds, and polymer-grafted nano-diamonds are then dispersed. Although the method can be used on ultra disperse nano-diamonds successfully, it is difficult to apply the method to monocrystalline nano-diamonds or polycrystalline nano-diamonds, which have larger sizes (>50 nm) and no surface graphite structures. Since the method requires oxidizing the graphite structure to facilitate polymer grafting, nano-diamonds without the surface graphite structure can not be grafted with polymers to stabilize the dispersion. Also, because the method requires multiple steps for chemical reactions and purifications, it is unfavorable for industrial applications. In China Patent Application No. 02115230.6, nano-diamonds were modified by the specific silane reagent. Although the method improved the stability of the nano-diamonds in medium, the cost of the silane reagent is high, and the reaction time is long, thus, limiting industrial applications. In another example such as China Patent Application No. 02139764.3, surfactant was added into nano-diamonds by gas flow pulverization, high pressure liquid flow pulverization, or bead milling. By physical pulverization or mechanical milling, the nano-diamonds were equally dispersed into solution. However, because the surfactant is absorbed on the surface of the nano-diamonds, the nano-diamonds can only be dispersed into some specific solvent, and therefore, the applications thereof are limited. Currently, all surface modification techniques of nano-diamonds focus on ultra disperse nano-diamonds, and there is no effective dispersion technique for monocrystalline or polycrystalline nano-diamonds, which have no graphite structure thereon. It is highly desirable to develop an effective and rapid technique to functionalize a surface of the nano-diamonds and to stably disperse the monocrystalline or the polycrystalline nano-diamonds into solvents. Thus, the invention provides a rapid and economically effective method to homogenously graft a lot amount of polymers onto surfaces of nano-diamonds. Moreover, all kinds of nano-diamonds can be modified, and the nano-diamonds can be uniformly dispersed in different solvents in high concentration.

BRIEF SUMMARY OF THE INVENTION

The invention provides a method for surface modification of nano-diamonds, comprising: heating a mixture of a metallic catalyst and nano-diamonds, thereby forming a graphite structure on a surface of the nano-diamonds, wherein the nano-diamonds comprise monocrystalline nano-diamonds, polycrystalline nano-diamonds, or combinations thereof.

The invention also provides a method for surface modification of nano-diamonds, comprising: providing nano-diamonds, wherein a surface of the nano-diamonds has a graphite structure; dispersing the nano-diamonds and olefinic monomers uniformly in a solvent to form a mixture; adding an initiator into the mixture slowly and applying energy to the mixture; and polymerizing the olefinic monomers to polymers, wherein the polymers are grafted onto the graphite structure on the surface of nano-diamonds, thereby forming a polymer layer.

The invention further provides a surface modified nano-diamond, comprising: a nano-diamond, wherein a surface of the nano-diamond has a graphite structure; and an polymer layer grafted onto the graphite structure.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
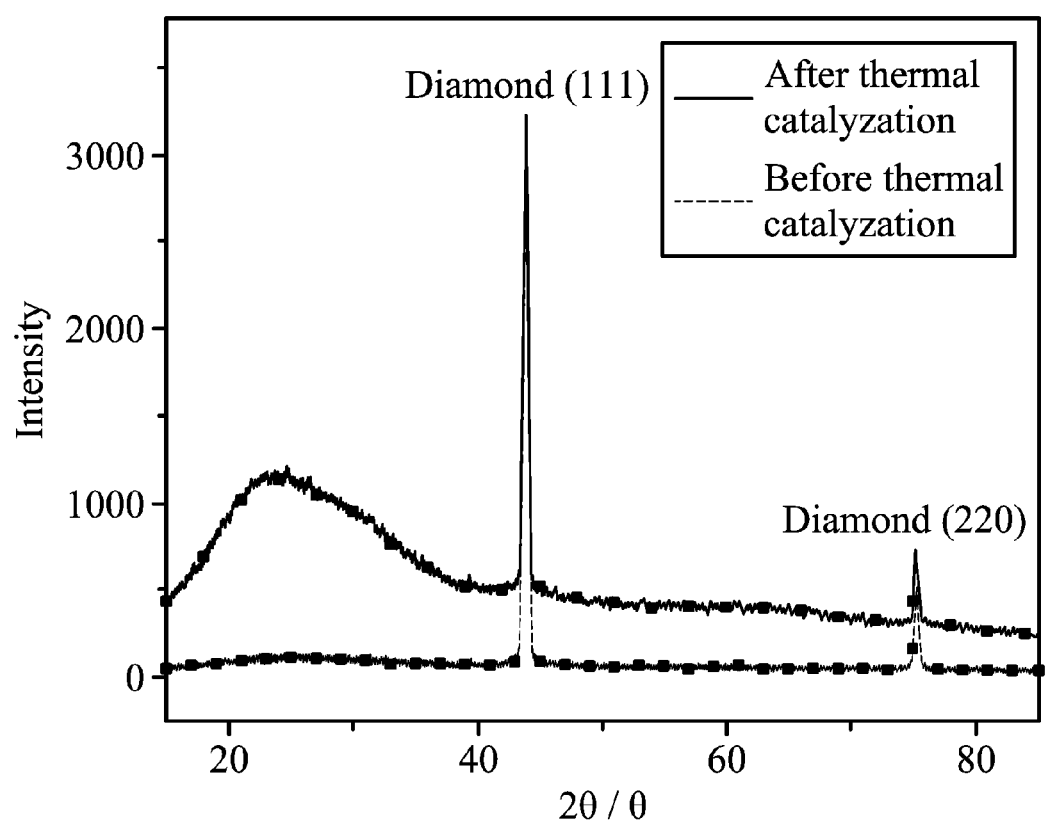
FIG. 1 is a powder diffraction spectrum of monocrystalline nano-diamonds before a thermal catalysis treatment and after a thermal catalysis treatment according to one embodiment of the invention.

The following description is the best-contemplated mode of carrying out the invention. This description is made for the purpose of illustrating the general principles of the invention and should not be taken in a limiting sense. The scope of the invention is best determined by reference to the appended claims.

It is desirable to transform the surfaces of monocrystalline or polycrystalline nano-diamonds into graphite structures, such that polymers can be grafted onto monocrystalline or polycrystalline nano-diamonds stably to facilitate dispersion thereof. In one embodiment of the invention, the particle size of the powder of monocrystalline and/or polycrystalline nano-diamonds is between 10 nm to 1000 nm in diameter. The nano-diamonds are evenly mixed with a metallic catalyst, and then placed in a furnace. The nano-diamonds of the above stated sizes are more appropriate for common uses. The metallic catalyst suitable for use herein comprises iron, cobalt, nickel, or combinations thereof. The weight ratio of the nano-diamonds to the metallic catalyst is between 0.5 and 2. If the proportion of the metallic catalyst is too high, the excess metallic catalyst will not further increase the speed or degree of graphitization of the nano-diamonds. Moreover, the excess metallic catalyst will increase the cost and difficulty of separation after catalysis. If the proportion of the metallic catalyst is too low, the surface of the nano-diamonds will not be graphitized within a short time. Next, high purity argon is purged continuously into the furnace to expel most of the oxygen, and the powder mixture is sintered at a high temperature of between 600° C. and 1300° C. for 10 minutes to 2 hours. If the sintering temperature is too high or the sintering time is too long, the graphite structure of the nano-diamonds will be too thick, or worse yet the nano-diamonds would be completely graphitized. To the contrary, if the sintering temperature is too low or the sintering time is too short, the graphite structure of the nano-diamonds will be too thin, or the nano-diamonds will not be graphitized at all.

After sintering, the mixed powder is immersed in aqua regia to remove most of the metallic catalyst. The surface modified mono or polycrystalline nano-diamonds are then obtained after being washed and centrifuged, wherein the monocrystalline or polycrystalline nano-diamonds have surface graphite structures. Powder diffraction spectroscopy, Raman spectroscopy, and X-ray photoelectron spectroscopy confirm that after sintering and catalysis, the surfaces of monocrystalline and/or polycrystalline nano-diamonds were transformed to the graphite structures. The thickness of the graphite structures described above is between 0.6 to 2 nm, wherein the thickness can be controlled by adjusting the sintering time and catalyzing temperature. If the graphite structure is too thick, the nano-diamonds will lose its transparent feature, and therefore applications will be limited. If the graphite structure is too thin, the polymers will not be uniformly grafted onto the surfaces of the nano-diamonds effectively.

Then, polymers are grafted onto the surface graphite structures of the nano-diamonds such that the nano-diamonds can be dispersed into all kinds of solvents or media uniformly. The monomers and the nano-diamonds with the surface graphite structures disperse uniformly into solvents. In the invention, the olefinic monomers may comprise styrene, methyl methacrylate, 2-hydroxyethyl methacrylate, acrylic acid, or the like. The solvents described above may be common polar solvents such as ethanol, or acetone, or non-polar solvents such as toluene, as long as polymerization and grafting is not negatively effected. A uniform dispersion may be achieved by performing 20 KHz to 40 KHz of ultrasonication, 60 rpm to 10,000 rpm of bead mill, or combinations thereof. If the frequency of the ultrasonication is too low or the speed of the bead mill is too slow, the nano-diamonds can not be dispersed into the solvents uniformly. If the frequency of the ultrasonication is too high or the speed of the bead mill is too fast, organic compounds may degrade due to a locally high temperature, and therefore lower the efficiency.

Next, an initiator is added into a solvent such as THF, followed by slow addition of the above mixture and application of an energy source. The energy source is in accordance with the type of initiators used. For example, if a photo initiator is used, the energy source will be light such as ultraviolet light. If a thermal initiator is used, the energy source will be heat. A thermal initiator suitable for use herein may comprise azo-base compounds such as 2,2'-azobis(2,4-dimethylaleronitrile), (dimethyl 2,2'-azobis(2-methylpropionate), 2,2-azobisisobutyronitrile (AIBN), 2,2-azobis(2-methylisobutyronitrile), 1,1'-azobis(cyclohexane-1-carbonitrile),2,2'-azobis[N-(2-propenyl)-2-methypropionamide], 1-[(cyano-1-methylethyl)azo]formamide, 2,2'-azobis (Z-butyl-2-methylpropionamide), 2,2'-azobis (N-cyclohexyl-2-methypropionamide), or other appropriate azo-initiators. Peroxide types comprise benzoyl peroxide (BPO), 1,1-bis(tert-butylperoxy)cyclohexane, 2,5-bis(tert-butylperoxy)-2,5-dimethylcyclohexane, 2,5-bis(tert-butylperoxy)-2,5-dimethyl-3-cyclohexane, bis(1-(tert-butyl-peorxy)-1-methyl-ethyl)benzene, tert-butyl hydroperoxide, tert-butyl peroxide, tert-butylperoxybenzoate, Cumene hydroperoxide, cyclohexanone peroxide, dicumyl peroxide, lauroyl peroxide, or other appropriate peroxides. An appropriate photo initiator may comprise acetophenone base compounds such as 2-methyl-1-(4-methylthio)phenyl)-2-morpholino-propane, 1-hydroxycyclohexyl phenyl ketone, diethoxyacetophenone, 2-hydroxy-2-methyl-1-phenyl-propane-1-one, 2-benzyl-2-(dimethylamino)-1-[4-(morpholinyl)phenyl]-1-butanone, or other appropriate base compounds. Appropriate benzoin base compounds are benzoin, benzoin methyl ether, benzyl dimethyl ketal, or other appropriate benzoin base compounds. Appropriate diphenylketone base compounds are benzophenone, 4-phenylbenzophenone, hydroxyl benzophenone, or other appropriate diphenylketone base compounds. Appropriate thioxanthone base compounds are isopropylthioxanthone, 2-chlorothioxanthone, or other appropriate thioxanthone base compounds. Appropriate anthraquinone base compounds are 2-ethylanthraquinone or other appropriate anthraquinone base compounds.

When the energy is applied to the initiator, an initiator will decompose to free radicals, such that the olefinic monomers polymerize into polymers and graft onto the surface graphite structure of the nano-diamonds. When the polymers graft onto the graphitized surface of the nano-diamonds, the nano-diamonds will be dispersed into a solvent more easily and expose more surface areas, allowing easier grafting of the polymers. After the steps described above, highly disperse surface modified nano-diamonds are obtained, wherein the polymer layer grafted thereon has a thickness of between 2 nm to 30 nm. According to thermogravimetric analysis, the weight ratio of the polymer layer to the nano-diamonds is between 5:100 to 25:100. If the polymer layer is too thin and/or the weight ratio is too small, the nano-diamonds will not be effectively stabilized in the solvent or the solubility will be too low. If the polymer layer is too thick and/or the weight ratio is too high, the polymers may negatively affect performance in certain applications. The polymers may be hydrophobic or hydrophilic, depending on substituents thereof. When the olefinic monomers and the polymerized polymers are hydrophilic, the solvents of the polymerization/grafting/dispersion steps are hydrophilic. Similarly, when the olefinic monomers and the polymerized polymers are hydrophobic, the solvents of the polymerization/grafting/dispersion steps are hydrophobic. Conditions such as volume ratio of the olefinic monomers and the solvent, amount of the initiator, and reaction time may be adjusted to maximize the speed of polymerization.

Note that in addition to the monocrystalline nano-diamonds and the polycrystalline nano-diamonds, the modification method is also suitable for ultra disperse diamonds which already have graphite structures on the surfaces thereof. The ultra disperse diamonds are manufactured by detonation synthesis. Although most of the ultra disperse diamonds have particle sizes of about 4 to 6 nm, the surface of the diamonds particles are often covered with a layer of fullerene-like carbons, and therefore the diamonds aggregate to a size of about 100 nm. The aggregation is through chemical bonds, and the fullerene-like carbons on the surface can provide a good condition for surface modification. Surface modification of the ultra disperse nano-diamonds may prevent physical aggregation and further prevent aggregation to form larger particles. Now, known techniques or patents can only modify the surface of the ultra disperse nano-diamonds to improve the dispersion in solvents. The surface modification of the invention can be used successfully on monocrystalline or polycrystalline nano-diamonds (which has not been achieved by prior techniques or patents). Moreover, the method of the invention can also be applied successfully to ultra disperse nano-diamonds, and has the features of high speed and applicability for industrial scale application.

Finally, the polymers grafted onto the nano-diamonds are centrifuged, and the ungrafted polymers and the solvent are removed. The nano-diamonds with the polymers grafted thereon are obtained after being washed for several times.

According to the results from IR spectroscopy, thermogravimetric analysis, and electron microscopy, it was confirmed that the method described above may enable the surface graphite structure of the nano-diamonds to be grafted by the polymers in high density. Moreover, the nano-diamonds can be stably dispersed in all kinds of polar and non-polar solvents.

Most of the conventional diamond modification techniques require several hours to one day to complete the reaction, and some methods involve several reaction steps. In comparison, the method of the invention is a one-pot-reaction, and takes only tens of minutes. Accordingly, the invention can save time and be applied to industrial application The application of the nano-diamonds modification method of the invention is wide. By the modification technique of the invention, the surfaces of nano-diamonds can be effectively modified by all kinds of hydrophilic and hydrophobic functional groups, which is difficult for conventional techniques. By surface modification of the invention, the nano-diamonds can have various functional groups, and can be dispersed into various polar or non-polar solvents such as water, ethanol, toluene, or the like. Therefore, the applications of the nano-diamonds of the invention are greatly expanded when compared to conventional techniques.

The stability of the nano-diamonds in different kinds of solvents is considerably improved by the invention. For example, nano-diamonds modified by polyacrylic acid can be stably dispersed in water with a high concentration of 2810 mg/L. The nano-diamonds modified by polystyrene can be stably dispersed in toluene with a high concentration of 2050 mg/L. The nano-diamonds modified by poly-2-hydroxyethyl methacrylate can be stably dispersed in ethanol with a high concentration of 1650 mg/L. The nano-diamonds modified by polymethylmethacrylate can be stably dispersed in THF with a high concentration of 2330 mg/L.

EXAMPLE 1

Figure 2:
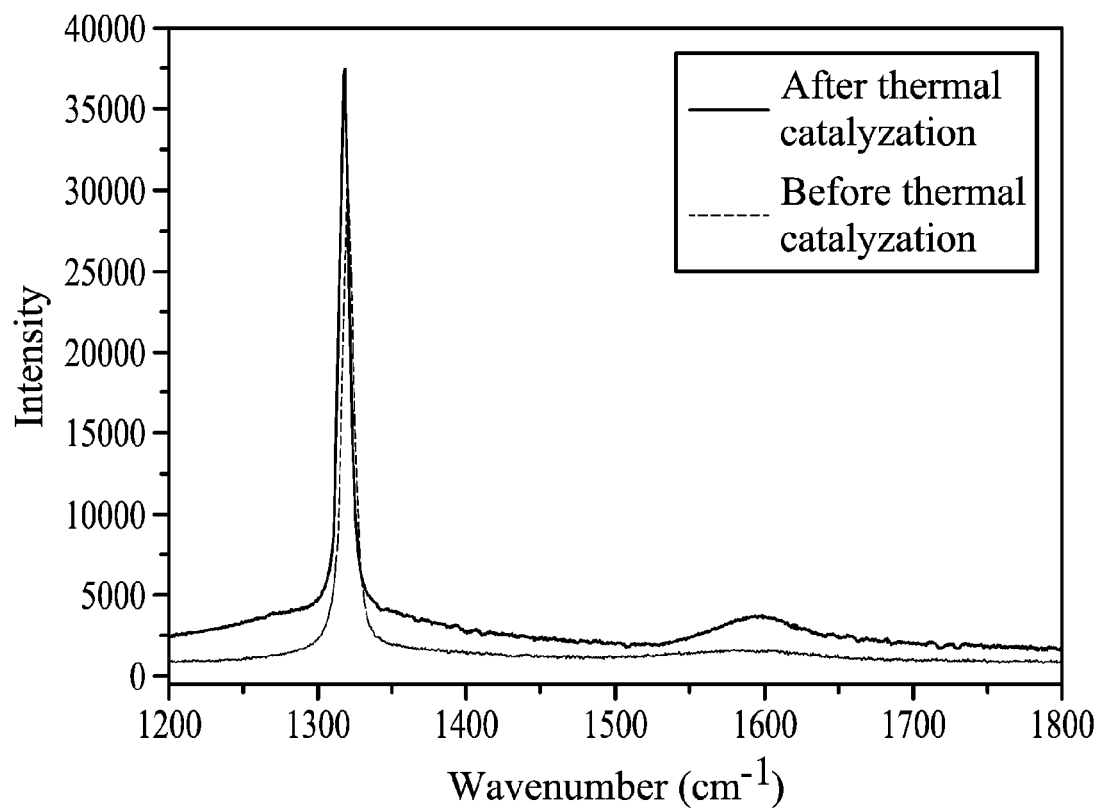
FIG. 2 is a Raman spectrum of monocrystalline nano-diamonds before a thermal catalysis treatment and after a thermal catalysis treatment according to one embodiment of the invention.
Figure 3:
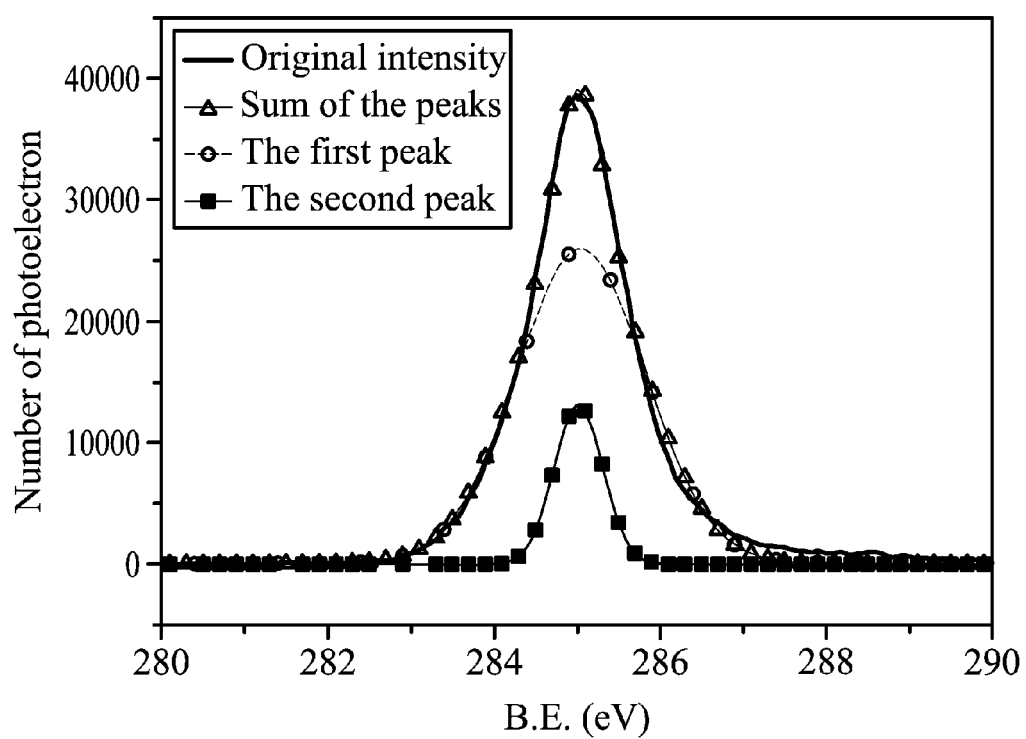
FIG. 3 is an X-ray photoelectron spectrum of $C_{1s}$ before a thermal catalysis treatment of the monocrystalline nano-diamonds according to one embodiment of the invention.
Figure 4:
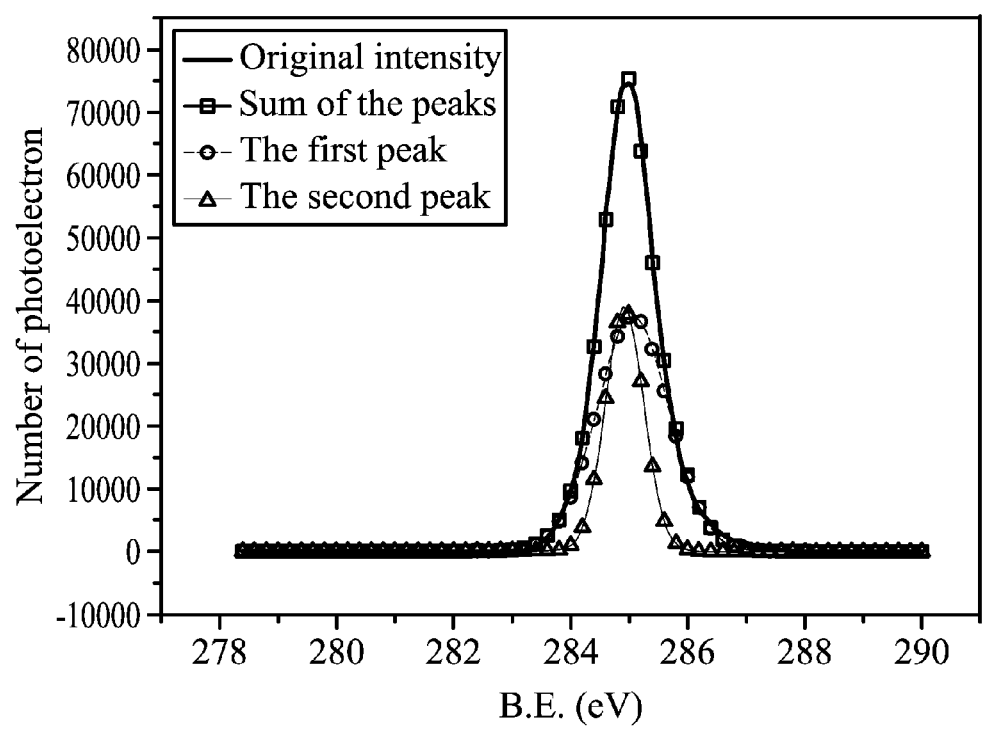
FIG. 4 is an X-ray photoelectron spectrum of $C_{1s}$ after a thermal catalysis treatment of monocrystalline nano-diamonds according to one embodiment of the invention.

100 g of monocrystalline nano-diamond powder having a particle size of around 240 nm (ABBA group, SND240) and 100 g of cobalt powder (Cobalt powder 99.8%, Strem Chemicals) were mixed uniformly and placed into a furnace. High purity argon was purged continuously into the furnace to expel most of the oxygen, and the powder of the mixture was sintered under a high temperature of 900° C. for about an hour. Then, the mixture was immersed into aqua regia to remove most of the catalyst and the cobalt powder therein. After being washed and centrifuged, monocrystalline or polycrystalline nano-diamonds with surface graphite structures were obtained. In order to confirm the results of graphitized the nano-diamonds, the graphitized condition was analyzed by a powder X-ray diffractometer (PANalytical X'PERT PRO), Raman spectroscopy (Jobin Yvon/labram HR, laser 532 nm), and X-ray photoelectron spectroscopy. FIG. 1 is a powder X-ray diffraction spectrum of the nano-diamonds before and after thermal treatments. Before and after the nano-diamonds were sintered, ethanol was added into the nano-diamonds respectively for ultrasonication for about ten minutes. The solution was left standing for a while, several drops of the supernatant were dropped to a copper grid covered over porous carbon film. The structure of the nano-diamond particles supported by the porous carbon films was analyzed by a high resolution transmission electron microscope (Jeol JEM-2100F, acceleration voltage 200 KeV) without background interference of the carbon film. The powder X-ray diffraction spectrum clearly showed the formation of the graphite structure on the surface of the nano-diamonds after being sintered under 900° C. and catalyzed by cobalt. In addition to the abrupt peaks of the nano-diamonds in (111) and (220) crystalline plane, there was a broader peak at θ of about 26° which indicated the graphite structure (002) crystalline plane with a pitch of about 0.34 nm. Since the degree of crystallization of the graphite structure formed by sintering and catalysis was not perfect, the peak of the graphite structure in (002) crystalline plane was broader. However, it was proven that surface atomic configuration of the nano-diamonds were transformed from $sp^3$ to $sp^2$. In addition to the powder X-ray diffractometer, a Raman spectroscopy was also used to detect the atomic configuration of materials. FIG. 2 is the Raman spectrum of the monocrystalline nano-diamonds before and after sintering and catalysis treatments. In the Raman spectrum, the major peak of the nano-diamonds was at about 1355 $cm^{-1}$, an $A_{1g}$ vibrational mode, which exists only when there is carbon $sp^3$ hybrid orbital, or defects on the graphite structure. For $sp^2$ bonding on the graphite structure, the major peak should be at about 1600 $cm^{-1}$, an $E_{2g}$ vibrational mode. Since the nano-diamonds had few carbons in $sp^2$ configuration, there were weaker and broader peaks at about 1600 $cm^{-1}$. After the monocrystalline nano-diamonds were sintered under high temperature, the peak around 1600 $cm^{-1}$ was enhanced and was more obvious. In other words, carbon $sp^2$ hybrid orbital constituted a larger percentage on the surface after being sintered. The Raman spectrum in FIG. 2 indicated an increase of $sp^2$ configuration in the nano-diamonds. The X-ray photoelectron spectroscopy is a very useful tool for material surface analysis and for determining the atomic configuration of material. FIG. 3 is the X-ray photoelectron spectroscopy of the nano-diamonds before the nano-diamonds were sintered under high temperature. FIG. 4 is the X-ray photoelectron spectroscopy of the nano-diamonds after being sintered under high temperature. Before the nano-diamonds were sintered, two major peaks of carbon $C_{1s}$ photoelectron signal were resolved: one broader peak of 285.05 eV, and the other abrupt peak of 285.02 eV. The two peaks, which were quite close to each other, both indicated that the photoelectron kinetic energy was around 285 eV of $C_{1s}$ in the nano-diamond materials. A slight difference may result from different environments between inner and outer of nanodiamond (on the surface). After the nano-diamonds were sintered, there were also two major photoelectron peaks: one broader peak of 285.03 eV, and the other abrupt peak shifted to around 284.91 eV. The photoelectron kinetic energy around 285.03 eV may still indicate $C_{1s}$ electronic ionization kinetic energy of $sp^3$ configuration. On the other hand, the photoelectron kinetic energy around 284.91 eV, close to the well-known photoelectron kinetic energy around 284.9 eV of $C_{1s}$ for a perfluorocarbon cellulose structure, may indicate $sp^2$ configuration of $C_1$, electron. The result of the X-ray photoelectron spectroscopy also confirmed that a portion of the nano-diamonds was transformed into the graphite structure after the thermal treatment. From the powder diffraction spectroscopy, Raman spectroscopy, and X-ray photoelectron spectroscopy described above, it was confirmed that the surface of the nano-diamonds was transformed into a graphite structure after being sintered under high temperature and catalyzed by the catalyst.

Figure 5:
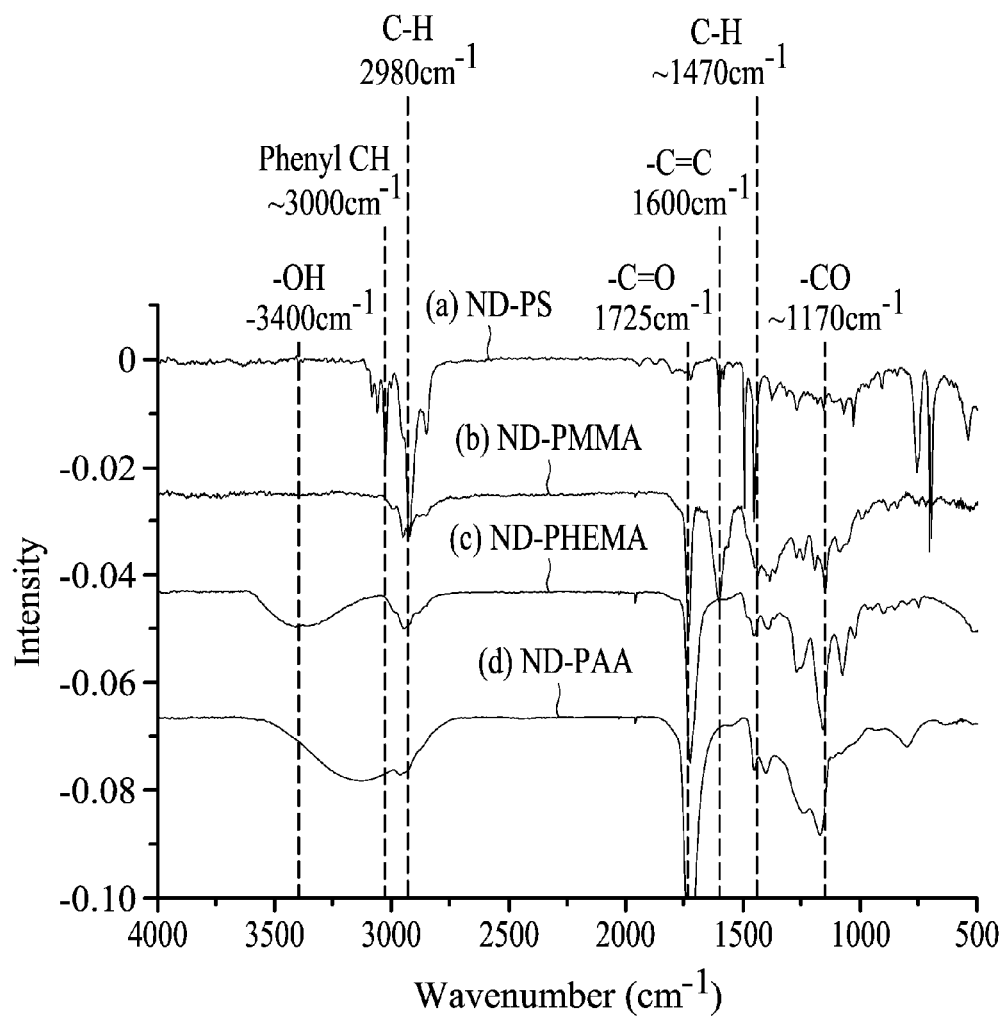
FIG. 5 is an IR spectrum of surfaces of monocrystalline nano-diamonds grafting to (a) polystyrene, (b) polymethyl methacrylate, (c) poly-2-hydroxyethyl methacrylate, and (d) polyacrylic acid according to one embodiment of the invention.

Next, 0.1 g of the monocrystalline nano-diamonds with the graphite surface as described above and 1 g of 2-hydroxyethyl methacrylate monomers were mixed in 7 mL of ethanol as a solvent. A probe of an ultrasonicator was immersed into the mixture described above. After the mixture was ultrasonicated for ten minutes, THF solution (0.3 mL) containing about 35 mg of a radical initiator benzoyl peroxide was added to the mixture. The mixture was heated to 80° C. under ultrasonication. The radical initiator produced radicals after heating, such that the monomers were polymerized into polymers, and the polymers grafted onto the surfaces of portions of the nano-diamonds dispersed by ultrasonication. Since the polymers grafted onto the surfaces of the nano-diamonds, the nano-diamonds were slowly dispersed into the solvent, and more and more surface areas were exposed. As a result, more and more polymers grafted onto the surfaces of the nano-diamonds. The nano-diamonds were eventually highly dispersed into ethanol, due to high density grafting. Finally, a high speed centrifuge was utilized to purify the nano-diamonds grafted with the polymers. The un-grafted polymers and the solvent were then removed. The nano-diamonds grafted with the polymers were obtained after being repeatedly washed. The method described above may apply to other olefinic monomers such as acrylic acid, styrene, and methyl methacrylate. Similar steps were adopted for polymers to be grafted onto graphite structures of nano-diamonds after polymerization. However, the volume ratio of monomers to the solvent, the amount of benzene peroxide, the reaction time, or other conditions may be optimized in accordance with the speed of polymerization for the monomers. FIG. 5 illustrates an IR spectrum of polymers grafting onto monocrystalline nano-diamonds, wherein the polymers comprised poly-2-hydroxyethyl methacrylate, polyacrylic acid, polystyrene, polymethyl methacrylate, or the like. Referring to FIG. 5, carbon-hydrogen (C—H) stretching absorption bands, such as about 2980 and 2932 $cm^{-1}$, and in lower frequencies, such as between 1430 and 1470 $cm^{-1}$, indicated that all the nano-diamonds grafted by the polymers had methylene structures thereon.

Other than the carbon-hydrogen (C—H) bonds of methylene, the nano-diamonds grafted by polystyrene (ND-PS) had carbon-hydrogen (C—H) stretching absorption band results from the aromatic groups, such as between about 3000 and 3100 $cm^{-1}$, and carbon-carbon conjugated double bonds (C═C) stretching absorption band results from the aromatic groups, such as at about 1600 $cm^{-1}$. The nano-diamonds grafted by polymethyl methacrylate (ND-PMMA) had high carbonyl vibration (C═O) absorption band results from the ester group such as at 1725 $cm^{-1}$ and a carbon-oxygen stretching (C—O) absorption band result from the ester group such as between 1050 and 1300 $cm^{-1}$. The nano-diamonds grafted by poly-2-hydroxyethyl methacrylate (ND-PHEMA) had functional groups of ester and alcohol. Therefore, the nano-diamonds grafted by poly-2-hydroxyethyl methacrylate not only had carbonyl vibration (C═O) absorption band results from the ester (at 1725 $cm^{-1}$) and carbon-oxygen stretching (C—O) absorption band results from the ester (between 1050 and 1300 $cm^{-1}$), but also a high and broad hydroxyl stretching and vibration (—OH) absorption band resulting from alcohol such as between 3200 and 3400 $cm^{-1}$. The nano-diamonds grafted by polyacrylic acid (ND-PAA) had carboxyl group, which consisted of carbonyl group (C═O) and hydroxyl group (—OH). Therefore, the spectrum thereof indicated stretching and vibration of carbonyl (C═O, about 1725 $cm^{-1}$) and hydroxyl (O—H) groups. However, due to the dimerism of the hydrogen bond, the hydroxyl stretching and vibration absorption band was between 2500 and 3000 $cm^{-1}$, lower than the alcohol. According to the IR spectrum in FIG. 5, it was confirmed that various functional groups were grafted onto the surface graphite structure of the nano-diamonds.

Figure 6:
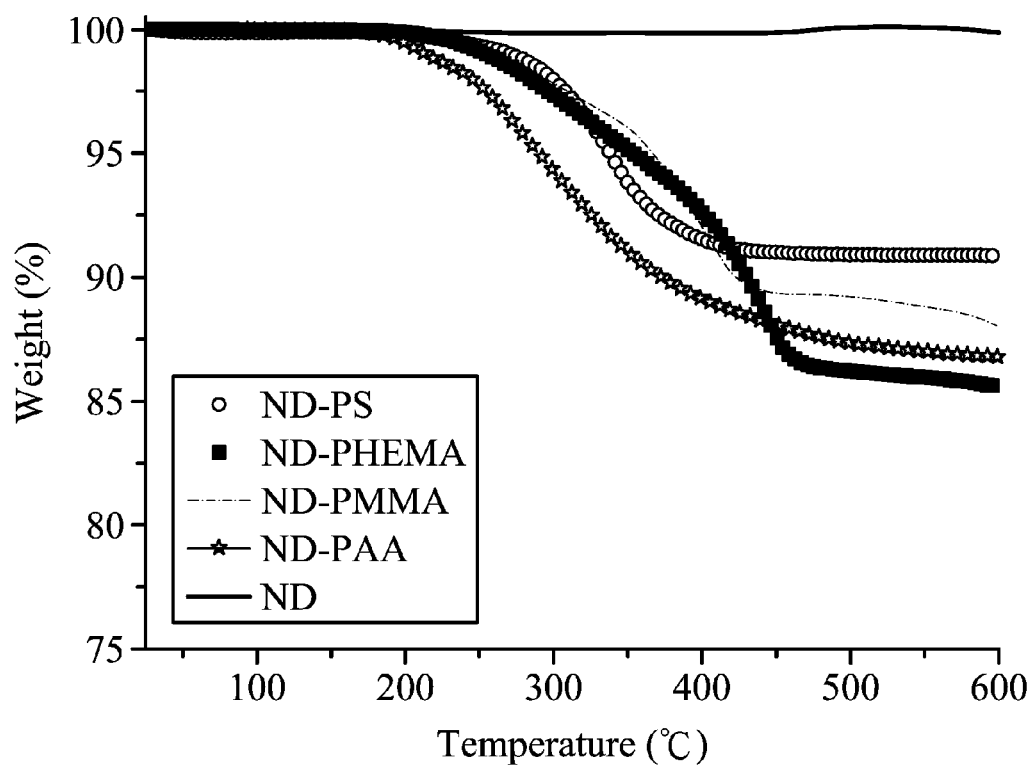
FIG. 6 is a thermogravimetric analyzing diagram of original monocrystalline nano-diamonds (ND), monocrystalline nano-diamonds grafting to polystyene (ND-PS), monocrystalline nano-diamonds grafting to polymethyl methacrylate (ND-PMMA), monocrystalline nano-diamonds grafting to poly-2-hydroxyethyl methacrylate (ND-PHEMA), and monocrystalline nano-diamonds grafting to polyacrylic acid (ND-PAA) according to one embodiment of the invention.

A thermogravimetric analyzer was used to analyze the weight ratio of the surface of the nano-diamonds grafted by the polymers. Referring to FIG. 6, thermogravimetry of the nano-diamonds grafted by various polymer chains were analyzed under a nitrogen atmosphere. Most grafting polymers were thermally decomposed under a nitrogen atmosphere about 200° C. to 400° C. According to FIG. 6, the polystyrene grafted onto ND-PS was about 8% by weight, the poly-2-hydroxyethyl methacrylate grafted onto ND-PHEMA was about 12% by weight, the poly methyl methacrylate grafted onto ND-PMMA was about 10% by weight, and the poly acrylic acid grafted onto ND-PAA was about 11% by weight. The key point of dispersing the nano-diamonds in the solvent stably was that the surfaces of the nano-diamonds had to be grafted by the polymers in a high weight ratio, although the particle size of the nano-diamonds was only about 240 nm. It was proven that a huge amount of functional groups may be grafted onto the surfaces of the nano-diamonds in high density in the invention.

In the invention, the image of the transmission electron microscope showed that the particle size of the raw monocrystalline nano-diamonds was about 240 nm. As shown by the transmission electron microscope, since the image contrast of particles of the monocrystalline nano-diamonds were clear and deep, the crystal structures were complete. The image of the low magnification rate transmission electron microscope of the nano-diamonds grafted by poly acrylic acid on the surface (ND-PAA) showed that the size of the nano-diamonds remained at about 240 nm. However, there was a low-contrast blurred layer, grafted onto the surface of the nano-diamonds, wherein the layer was amorphous. The image of the high magnification rate transmission electron microscope of the nano-diamonds grafted by polyacrylic acid on the surface (ND-PAA) showed that there were two layers formed on the surface of the nano-diamonds, wherein the image contrast of the particle of the outer layer was shallow and blurred and the image contrast of particle of the inner layer was clear and deep. By comparing the images, it was shown that the substance having image contrast of shallow and blurred particles was polyacrylic acid, while the substance having image contrast of clear and deep particles was the nano-diamonds. Such a structure was formed due to the polymers being grafted onto the surface of the nano-diamonds. The transmission electron microscope also confirmed that the polymers were grafted onto the surface of the nano-diamonds.

According to X-ray powder diffraction spectroscopy, Raman spectroscopy, and X-ray photoelectron spectroscopy, it was confirmed that a portion of the surface structure of the nano-diamonds transformed to the graphite structure after the thermal treatment and cobalt catalyst catalysis. The increase of the surface graphite structure of the nano-diamonds led to the increase of the surface area of surface modification and the grafting of the polymer, such that the nano-diamonds were dissolved in the solvents. According to the structure analyzed by IR spectroscopy, thermogravimetric analysis, and electron microscopy, it was proved that by the grafting and modification method of the invention, the surface of the nano-diamonds were grafted by the polymers in high density, and the nano-diamonds were dispersed into different kinds of solvents. Solubility toward different solvents, particle size in the solvents, and thermogravimetric analysis before and after the modification of the monocrystalline nano-diamonds are shown in Table 1. As shown in Table 1, the nano-diamonds had good solubility after modification, and did not aggregate into large particles. In Table 1, the solubility was defined by the weight of the nano-diamonds dissolved/each ml of solvent after being in place for three days. The size of the particles was measured by the particle size analyzer (Dynamic laser scattering particle size distribution analyzer, Horiba LB-550). The thermogravimetric analysis was measured by placing the dried nano-crystal powder into a furnace (600° C.) within nitrogen and then measuring the rate of weight being lost.

TABLE 1

| | Solubility in solvent | Particle size analysis | Thermogravimetric analysis |
|---|---|---|---|
| Nano-diamonds without modification(ND) | | | |
| ND dispersed in water | About 35 mg/L | ≥6 μm | About 0% |
| ND dispersed in ethanol | About 54 mg/L | ≥6 μm | About 0% |
| ND dispersed in THF | About 66 mg/L | ≥6 μm | About 0% |
| ND dispersed in toluene | About 68 mg/L | ≥6 μm | About 0% |
| Nano-diamonds after modification | | | |
| ND-PAA dispersed in water | About 2810 mg/L | About 212 nm | About 11% |
| ND-PHEMA dispersed in ethanol | About 1650 mg/L | About 410 nm | About 12% |
| ND-PMMA dispersed in THF | About 2330 mg/L | About 280 nm | About 10% |
| ND-PS dispersed in toluene | About 2050 mg/L | About 313 nm | About 8% |

EXAMPLE 2

In the Example 1, the ultrasonication process was generally used in the step where the polymers were grafted onto the surface of the nano-diamonds, such that the aggregated nano-diamonds were forced to be dispersed, and the surface of the nano-diamonds had addiction reactions with the free radicals. In the Example 2, a bead mill was used to achieve the same goal. First, zirconia beads having a size of about 200 μm was mixed with 10 g of monocrystalline nano-diamonds (particle size about 240 nm, ABBA group, SND240), and ethanol (300 ml) containing 80 g of the 2-hydroxyethyl methacrylate monomer was added into a milling chamber. The temperature of recycled water outside the milling chamber was set at 80° C. The mill was tightly closed with cover and the content agitated at a peripheral speed 2400 rpm. Finally, 1 g of a radical initiator benzoyl peroxide was dissolved in 10 ml of a tetrahydro furan, and the mixture was injected into the milling chamber at a speed about 10 ml per hour during the bead milling process. Aggregated nano-diamonds were dispersed by the milling process. Meanwhile, radicals of the polymerization process resulting from the benzene peroxide were added onto the surface of the nano-diamonds. The nano-diamonds were grafted by the polymers, and were gradually and stably dispersed into the solvents. Then, the nano-diamonds with the surface grafted by the polymers were eventually stably dispersed into the solvents. The zirconia beads was removed and ethanol of the same volume was added. The polymers which were not grafted onto the surface of the nano-diamonds were removed by high speed centrifugal force. After being washed for several times and dried, the nano-diamonds grafted with 2-hydroxyethyl methacrylate were obtained. Table 2 shows solubility in water, particle size analysis, and thermogravimetric analysis of the modified nano-diamonds of the Example 2. The measurements were the same as in Table 1. Comparing Table 1 and Table 2, it is shown that the difference between the performances of the ultrasonication and the milling process for the same polymers grafted onto the same nano-diamonds was small. Compared to the ultrasonication process of the Example 1, the milling process of the Example 2 may be applied to a larger amount of modified nano-diamonds.

TABLE 2

| Nano-diamonds after modification | Solubility in solvent | Particle size analysis | Thermogravimetric analysis |
|---|---|---|---|
| ND-PAA dispersed in water | About 2530 mg/L | About 230 nm | About 9% |

EXAMPLE 3

0.1 g of ultra disperse nano-diamonds (UDD, ABBA group, obtained by detonation method and then purify by acid oxidation to remove impurity) was added into ethanol (8 ml) containing 1 g of acrylic acid. A probe of an ultrasonicator was immersed into the solution. The mixture was treated with sonication at 250 W condition continuously, and THF solution (0.3 mL) containing about 35 mg of the radical initiator benzoyl peroxide was added into the mixture. The mixture was heated to 80° C. and was continuously under sonication process. The radical initiator decomposed to radicals after heating, such that the monomers were polymerized to polymers, and the polymers were grafted onto the surfaces of the nano-diamonds which were dispersed by ultrasonication. Since the polymers grafted onto the surfaces of nano-diamonds, the nano-diamonds were slowly dispersed into the solvent, and therefore more and more surface areas were exposed. As a result, more and more polymers were grafted onto the surfaces of the nano-diamonds. After ultrasonication and stirring severely for ten minutes, 35 mg of the radical initiator benzoyl peroxide in THF was added again to the mixture, in order to refill the radicals so that the radical reaction continued on the surface of the nano-diamonds. After the radical initiator was added into the solution for three times, ethanol of the same volume was then added into the mixture. The nano-diamonds were precipitated by centrifugal force. After washing by centrifuge for several times, most of the polyacrylic acid which was not grafted onto the surface of the nano-diamonds was removed. Finally, the nano-diamonds grafted with the polyacrylic acid were obtained and the characteristics are shown in Table 3.

TABLE 3

| Ultra disperse nano-diamonds after modification | Solubility in solvent | Particle size analysis | Thermogravimetric analysis |
|---|---|---|---|
| UDD-PAA dispersed in water | About 4000 mg/L | About 130 nm | About 18% |

EXAMPLE 4

Polycrystalline nano-diamond (PND, ABBA group, PND 130), which was a single circular particle without an sp² graphite structure on the surface thereon, required a graphitization process comprising metallic catalysis on the surface of the nano-diamond. The steps were similar to the graphitization process on the surface of the monocrystalline nano-diamonds, but the experimental conditions were adjusted to achieve the best condition. The steps of the process were roughly described as follows. 100 g of the polycrystalline nano-diamonds and cobalt were mixed uniformly, and the mixture was placed into a furnace, wherein the furnace was continuously purged in high purity nitrogen to expel most of the oxygen. The powder of the mixture was sintered under high temperature of up to 900° C. for about an hour. Then, the powder of the mixture was immersed in aqua regia to remove most of the catalyst cobalt. Next, 5 g of the powder of the polycrystalline nano-diamonds, which surfaces were catalyzed into graphite structure, and 80 g of the methyl methacrylate were added into a milling chamber. Then, an appropriate amount of zirconia beads at a size of about 200 μm was also added therein. 1 g of the radical initiator benzoyl peroxide was dissolved in 10 ml of tetrahydro furan, and the mixture was injected into the chamber at a speed of about 10 ml per hour during the milling process. The temperature of the recycled water outside of the chamber of the bead mill was set at 80° C. The content agitated at a peripheral speed was 2400 rpm. During the milling process, the radical initiator polymerized the monomer, and the aggregated nano-diamonds were dispersed. The zirconia beads were removed by a filter, and THF of the same volume was added. The polymers which were not grafted onto the surface of the nano-diamonds were removed by high speed centrifuge. After being washed for several times and dried, the polycrystalline nano-diamonds grafted by the polymers were obtained. After being washed by centrifuge for several times, most of the poly methyl methacrylate which were not grafted onto the surface of the polycrystalline nano-diamonds was removed. Finally, the polycrystalline nano-diamonds grafted with the poly methyl methacrylate were obtained and the characteristics are shown in Table 4.

TABLE 4

| Polycrystalline nano-diamonds after modification | Solubility in solvent | Particle size analysis | Thermogravimetric analysis |
|---|---|---|---|
| PND-PMMA dispersed in THF | About 3800 mg/L | About 142 nm | About 19% |

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for surface modification of nano-diamonds, comprising:
    heating a mixture of a metallic catalyst and nano-diamonds, thereby forming a graphite structure on a surface of the nano-diamonds, wherein the nano-diamonds comprise monocrystalline nano-diamonds, polycrystalline nano-diamonds, or combinations thereof.

2. The method for surface modification of nano-diamonds as claimed in claim 1, wherein the mass ratio of the metallic catalyst to the nano-diamonds is between 0.5 and 2.

3. The method for surface modification of nano-diamonds as claimed in claim 1, wherein the metallic catalyst comprises iron, cobalt, nickel, or combinations thereof.

4. The method for surface modification of nano-diamonds as claimed in claim 1, wherein the heating procedure is carried out at a temperature of between 600° C. and 1300° C.

5. The method for surface modification of nano-diamonds as claimed in claim 1, wherein the nano-diamonds have a particle size of between 100 nm and 1000 nm.

6. The method for surface modification of nano-diamonds as claimed in claim 1, further comprising:

dispersing the nano-diamonds, which has the graphite structure on the surface, and olefinic monomers uniformly in a solvent to form a mixture;

adding an initiator into the mixture slowly and applying energy to the mixture; and polymerizing the olefinic monomers to polymers, wherein the polymers are grafted onto the graphite structure on the surface of nano-diamonds, thereby forming a polymer layer.

7. The method for surface modification of nano-diamonds as claimed in claim 6, wherein the initiator comprises thermal initiators, photo-initiators, or combinations thereof.

8. The method for surface modification of nano-diamonds as claimed in claim 6, wherein the polymers are hydrophilic or hydrophobic.

9. The method for surface modification of nano-diamonds as claimed in claim 6, wherein a mass ratio of the polymer layer to the nano-diamonds is between 5:100 and 25:100.

10. The method for surface modification of nano-diamonds as claimed in claim 6, wherein the dispersing procedure comprises 20 KHz to 40 KHz of ultrasonication, 60 rpm to 10,000 rpm of bead mill, or combinations thereof.

* * * * *